(12) United States Patent
Wu et al.

(10) Patent No.: US 11,719,997 B2
(45) Date of Patent: Aug. 8, 2023

(54) OPTICAL ELEMENT DRIVING MECHANISM

(71) Applicant: TDK TAIWAN CORP., Taoyuan (TW)

(72) Inventors: Fu-Yuan Wu, Taoyuan (TW); Sin-Hong Lin, Taoyuan (TW); Che-Hsiang Chiu, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 384 days.

(21) Appl. No.: 16/746,354

(22) Filed: Jan. 17, 2020

(65) Prior Publication Data

US 2020/0249419 A1 Aug. 6, 2020

Related U.S. Application Data

(60) Provisional application No. 62/799,886, filed on Feb. 1, 2019.

(30) Foreign Application Priority Data

Dec. 20, 2019 (EP) .................................... 19218896

(51) Int. Cl.
| | |
|---|---|
| *G02B 7/09* | (2021.01) |
| *G02B 27/64* | (2006.01) |
| *G03B 9/06* | (2021.01) |
| *G02B 7/08* | (2021.01) |
| *G03B 13/36* | (2021.01) |

(Continued)

(52) U.S. Cl.
CPC .................. *G03B 9/06* (2013.01); *G02B 7/08* (2013.01); *G02B 7/09* (2013.01); *G02B 27/646* (2013.01); *G03B 5/06* (2013.01); *G03B 13/36* (2013.01); *G03B 30/00* (2021.01); *G03B 2205/0023* (2013.01); *G03B 2205/0069* (2013.01); *H04N 23/57* (2023.01); *H04N 23/687* (2023.01)

(58) Field of Classification Search
CPC . G02B 7/09; G02B 7/005; G02B 7/04; G02B 7/10; G02B 27/64; G02B 27/646; G02B 13/001; G02B 7/023; G02B 7/08; G03B 5/00; G03B 13/34; G03B 13/36; G03B 13/32; G03B 2205/0069; G03B 2205/0015; G03B 2205/0007; G03B 2205/0046; G03B 19/22; G03B 3/10; G03B 17/02; H04N 5/2328; H04N 5/2253; H04N 5/2254; H05K 1/18; H02K 41/0354; H02K 41/0356
USPC ........... 359/822, 823, 824, 694, 813; 396/89
See application file for complete search history.

(56) References Cited

U.S. PATENT DOCUMENTS

2013/0287383 A1* 10/2013 Haruguchi ........... H04N 5/2257
396/144
2017/0235095 A1* 8/2017 Sekimoto ............. H04N 5/2254
359/824

* cited by examiner

*Primary Examiner* — Marin Pichler
(74) *Attorney, Agent, or Firm* — Muncy, Geissler, Olds & Lowe, P.C.

(57) ABSTRACT

An optical element driving mechanism includes an optical element, a fixed assembly, a movable assembly, and a driving assembly. The optical element has an optical axis. The movable assembly is movably with respect to the fixed assembly and configured to hold the optical element. The driving assembly is configured to drive the movable assembly to move relative to the fixed assembly. When viewed along the optical axis, the optical element driving mechanism with a rectangular structure has a long side and a short side, and a length of the long side is not equal to a length of the short side.

22 Claims, 11 Drawing Sheets

(51) Int. Cl.
*G03B 5/06* (2021.01)
*G03B 30/00* (2021.01)
*H04N 23/57* (2023.01)
*H04N 23/68* (2023.01)

OPTICAL ELEMENT DRIVING MECHANISM

CROSS REFERENCE TO RELATED APPLICATIONS

This application claims the benefit of U.S. Provisional Application No. 62/799,886, filed Feb. 1, 2019, and EP Patent Application No. 19218896.9, filed Dec. 20, 2019, the entirety of which are incorporated by reference herein.

BACKGROUND OF THE DISCLOSURE

Field of the Disclosure

The present disclosure relates to an optical element driving mechanism, and in particular it relates to an optical element driving mechanism having a rectangular structure.

Description of the Related Art

As technology has developed, many of today's electronic devices (such as smartphones) have a camera or video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of the users.

Therefore, how to design a camera module capable of being disposed on the front side or the rear side of an electronic device and capable of achieving miniaturization are topics nowadays that need to be discussed and solved.

BRIEF SUMMARY OF THE DISCLOSURE

Accordingly, one objective of the present disclosure is to provide an optical element driving mechanism to solve the above problems.

According to some embodiments of the disclosure, an optical element driving mechanism is provided and includes an optical element, a fixed assembly, a movable assembly, and a driving assembly. The optical element has an optical axis. The movable assembly is movably with respect to the fixed assembly and configured to hold the optical element. The driving assembly is configured to drive the movable assembly to move relative to the fixed assembly. When viewed along the optical axis, the optical element driving mechanism with a rectangular structure has a long side and a short side, and a length of the long side is not equal to a length of the short side.

According to some embodiments, the optical element includes a first section, a second section and a central section disposed between the first section and the second section, wherein when viewed in a direction perpendicular to the optical axis, a maximum size of the first section is different from a maximum size of the second section, the central section has an intermediate surface that is not parallel to the optical axis, the fixed assembly has a fixed assembly opening, and the movable assembly has a moving assembly opening for accommodating the optical element and corresponding to the optical axis. When viewed in the direction perpendicular to the optical axis, a maximum size of the fixed assembly opening is different from a maximum size of the moving assembly opening, and the central section is located between the moving assembly opening and the fixed assembly opening.

According to some embodiments, the first section includes a first lens barrel and a first lens, the second section includes a second lens barrel and a second lens, and diameters of the first lens and the second lens are different.

According to some embodiments, the movable assembly includes a lens holder, and the lens holder is fixedly connected to at least one of the first lens barrel, the second lens barrel and the central section by an adhesive element.

According to some embodiments, the lens holder further includes a body and a contacting portion, and the contacting portion is disposed between the optical element and the body, so that a gap is formed between the central section and the movable assembly, and the adhesive element is disposed in the gap.

According to some embodiments, the movable assembly has a first surface and a second surface perpendicular to each other, a first portion of the adhesive element is connected to the first surface, a second portion of the adhesive element is connected to the second surface, and the first portion is larger than the second portion.

According to some embodiments, the movable assembly with a polygonal structure has a concave groove, disposed on a first side of the moving assembly, the concave groove is formed along a direction parallel to the optical axis, and when viewed along the optical axis, the concave groove only partially overlaps the first section or the second section.

According to some embodiments, a first corresponding portion of the optical element is exposed from the concave groove and directly faces a side wall of the fixed assembly, and the side wall is parallel to the optical axis, wherein when viewed in the direction perpendicular to the optical axis, no part of the movable assembly is located between the first corresponding portion and the side wall.

According to some embodiments, the movable assembly further includes a projecting portion, the projecting portion and the concave groove are arranged along the direction parallel to the optical axis, the projecting portion extends along the direction parallel to the optical axis, and when viewed along the optical axis, the projecting portion, the concave groove, and the second section are partially overlapped.

According to some embodiments, the optical element driving mechanism further comprises a first elastic member, the movable assembly is elastically connected to the fixed assembly via the first elastic member, and the first elastic member has a first movable connecting portion which is fixedly disposed on the projecting portion.

According to some embodiments, the optical element driving mechanism further comprises a second elastic member, the movable assembly is elastically connected to the fixed assembly via the second elastic member, the second elastic member has a second movable connecting portion which is fixedly disposed on the movable assembly, and when viewed in the direction parallel to the optical axis, at least a part of the first movable connecting portion does not overlap the second movable connecting portion.

According to some embodiments, the optical element driving mechanism further comprises a position sensing assembly for sensing movement of the movable assembly relative to the fixed assembly, and a portion of the position sensing assembly is disposed on the first side.

According to some embodiments, when viewed in a direction parallel to the first side, the position sensing assembly partially overlaps the concave groove.

According to some embodiments, a portion of the driving assembly is disposed on a second side of the movable assembly, and when viewed in the direction parallel to the first side, a central axis of the portion of the driving assembly is offset from a central axis of the optical element.

According to some embodiments, the optical element driving mechanism further comprises a position sensing assembly, the fixed assembly is made of a plastic material, and a portion of the position sensing assembly is disposed on the fixed assembly.

According to some embodiments, the fixed assembly includes a side wall, and the side wall has a first side surface and a second side surface opposite to each other, the second side surface faces the optical element, and an accommodating groove is formed on the first side surface and is configured to accommodate the portion of the position sensing assembly.

According to some embodiments, the optical element driving mechanism further comprises a protective element disposed in the accommodating groove and covering the portion of the position sensing assembly.

According to some embodiments, the optical element driving mechanism further comprises a circuit member embedded in the fixed assembly.

According to some embodiments, the fixed assembly includes a base, the base has a protrusion, and the protrusion and the concave groove are located on the first side of the movable assembly.

According to some embodiments, the protrusion partially overlaps the concave groove when viewed along the optical axis.

According to some embodiments, the optical element driving mechanism is disposed on an electronic device, and the long side of the optical element driving mechanism and a long side of the electronic device are not parallel.

The present disclosure provides an optical element driving mechanism disposed in a portable electronic device. Because the optical element driving mechanism has a rectangular structure, the area of the touch panel of the portable electronic device can be designed to be larger. In addition, the optical element driving mechanism having the rectangular structure can improve the performance of the photographing, achieve the purpose of miniaturization, and improve image quality at the same time.

In addition, in some embodiments of the present disclosure, the lens holder has a rectangular structure, and two concave grooves are disposed on the two first sides of the rectangular structure. The concave grooves are configured to accommodate a portion of the optical element, so that the lens holder with a rectangular structure can accommodate a larger optical element, thereby improving the quality of the image.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
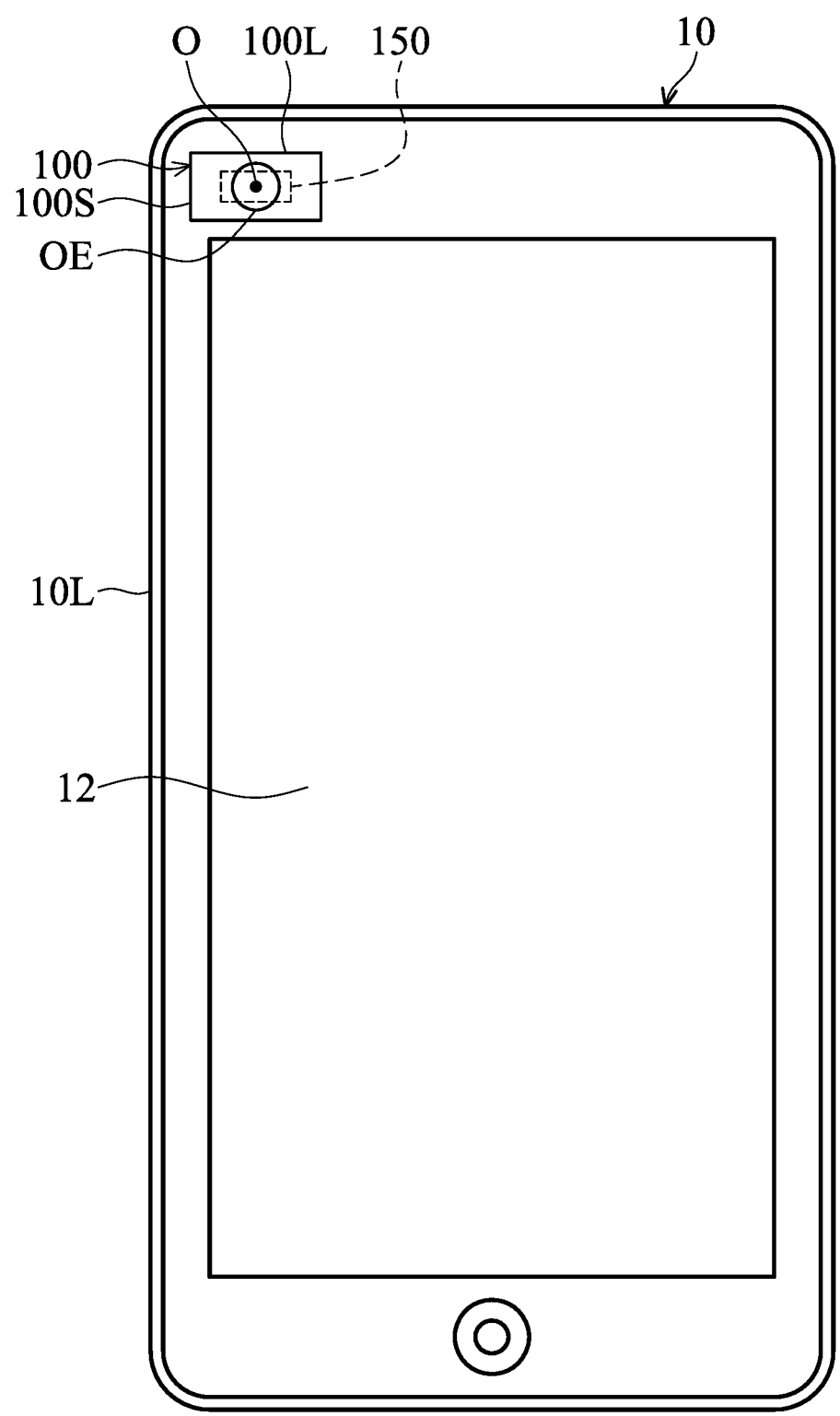
FIG. 1 shows a front view of an electronic device 10 according to an embodiment of the present disclosure.
Figure 1:
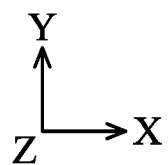

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which shows a front view of an electronic device 10 according to an embodiment of the present disclosure. The electronic device 10 can be a portable electronic device. As shown in FIG. 1, an optical element driving mechanism 100 can be disposed on an upper side of a touch panel 12 of the electronic device 10, and the optical element driving mechanism 100 can be an optical camera system and can be configured to hold and drive an optical element OE. The optical element driving mechanism 100 can be installed in various electronic devices or portable electronic devices, such as a smartphone (for example, the electronic device 10), for allowing a user to perform the image capturing function. In this embodiment, the optical element driving mechanism 100 can be a voice coil motor (VCM) with an auto-focusing (AF) function, but it is not limited thereto. In other embodiments, the optical element driving mechanism 100 can also perform the functions of auto-focusing and optical image stabilization (OIS).

As shown in FIG. 1, when viewed along the optical axis O (the Z-axis direction) of the optical elements OE, the optical element driving mechanism 100 has a rectangular structure. That is, the optical element driving mechanism 100 has a long side 100L and a short side 100S which are not equal. In addition, the long side 100L of the optical element driving mechanism 100 and a long side 10L of the electronic device 10 are not parallel. In addition, the optical element driving mechanism 100 may have a photosensitive element 150, configured to receive the light which travels through the optical element OE along the optical axis O. The photosensitive element 150 may also have a rectangular structure, and a longitudinal axis (along the X-axis) of the photosensitive element 150 is not parallel to a longitudinal axis (along the Y-axis) of the electronic device 10. However, in other embodiments, the longitudinal axis of the photosensitive element 150 can be parallel to the longitudinal axis of the electronic device 10.

Based on the above design of the optical element driving mechanism 100, the performance of photographing can be improved, and both miniaturization and image quality improvement can be achieved at the same time.

Figure 2:
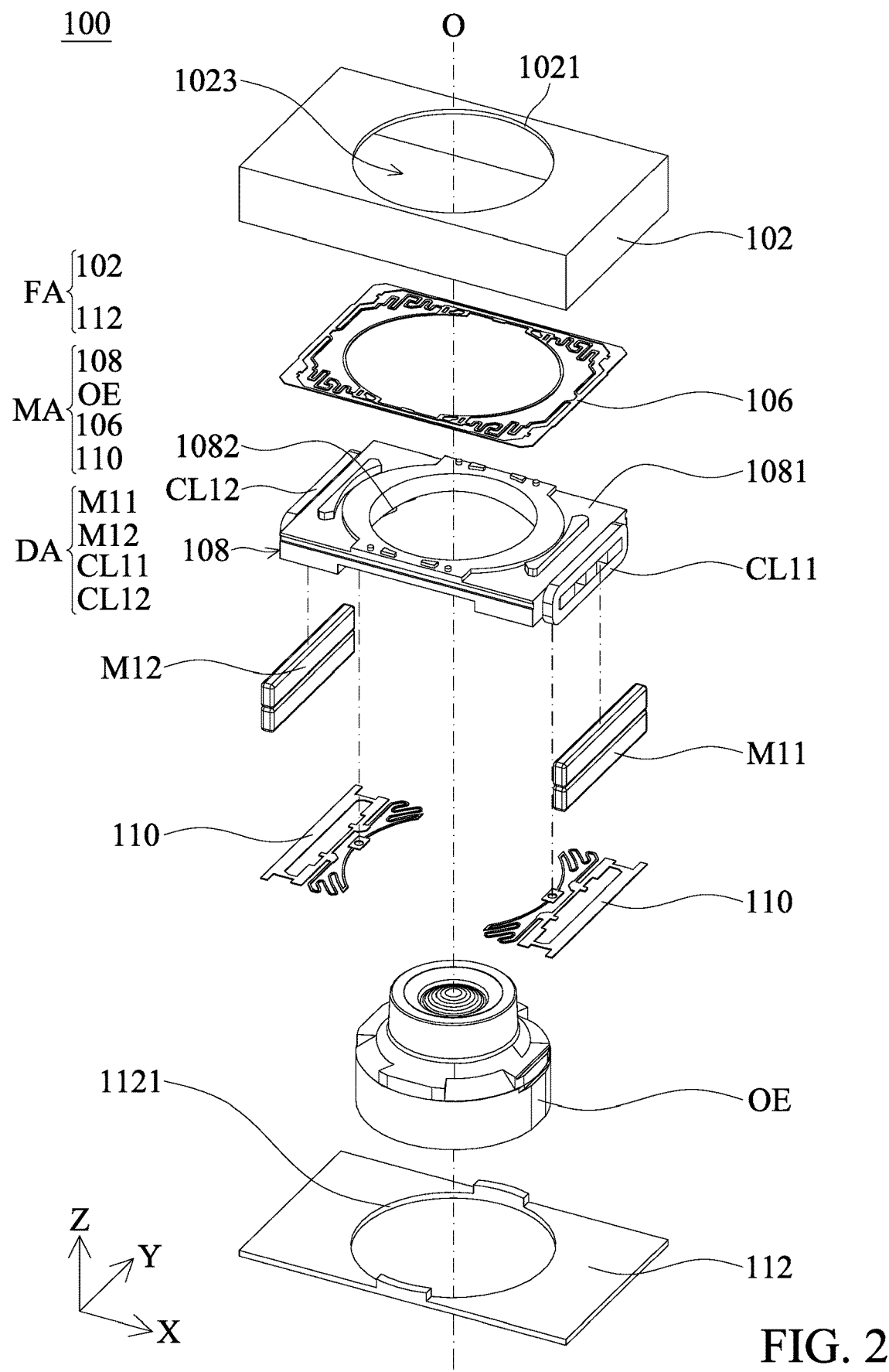
FIG. 2 is an exploded diagram of the optical element driving mechanism 100 according to an embodiment of the present disclosure.
Figure 3:
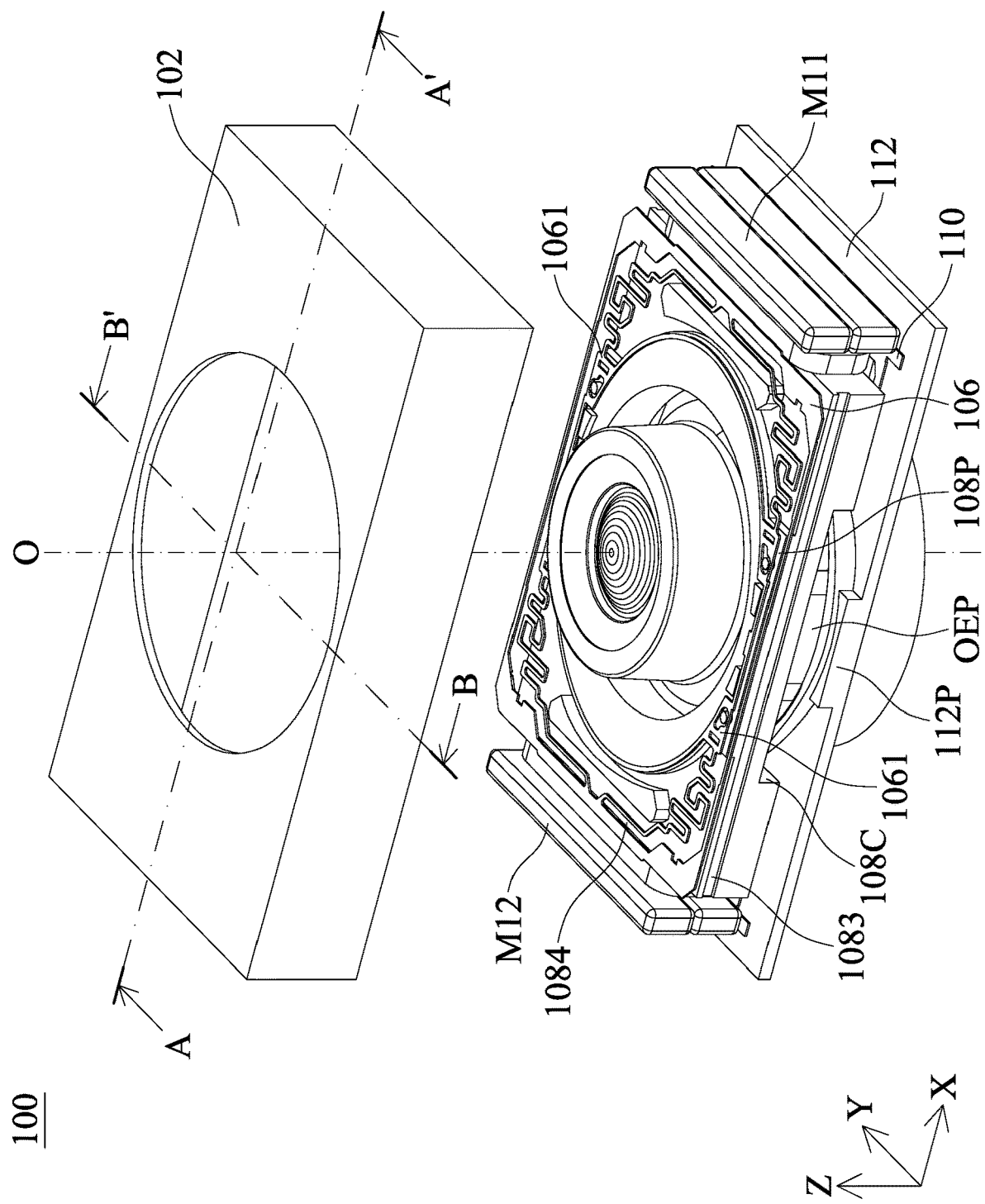
FIG. 3 is a partial exploded diagram of the optical element driving mechanism 100 according to an embodiment of the present disclosure.
Figure 4:
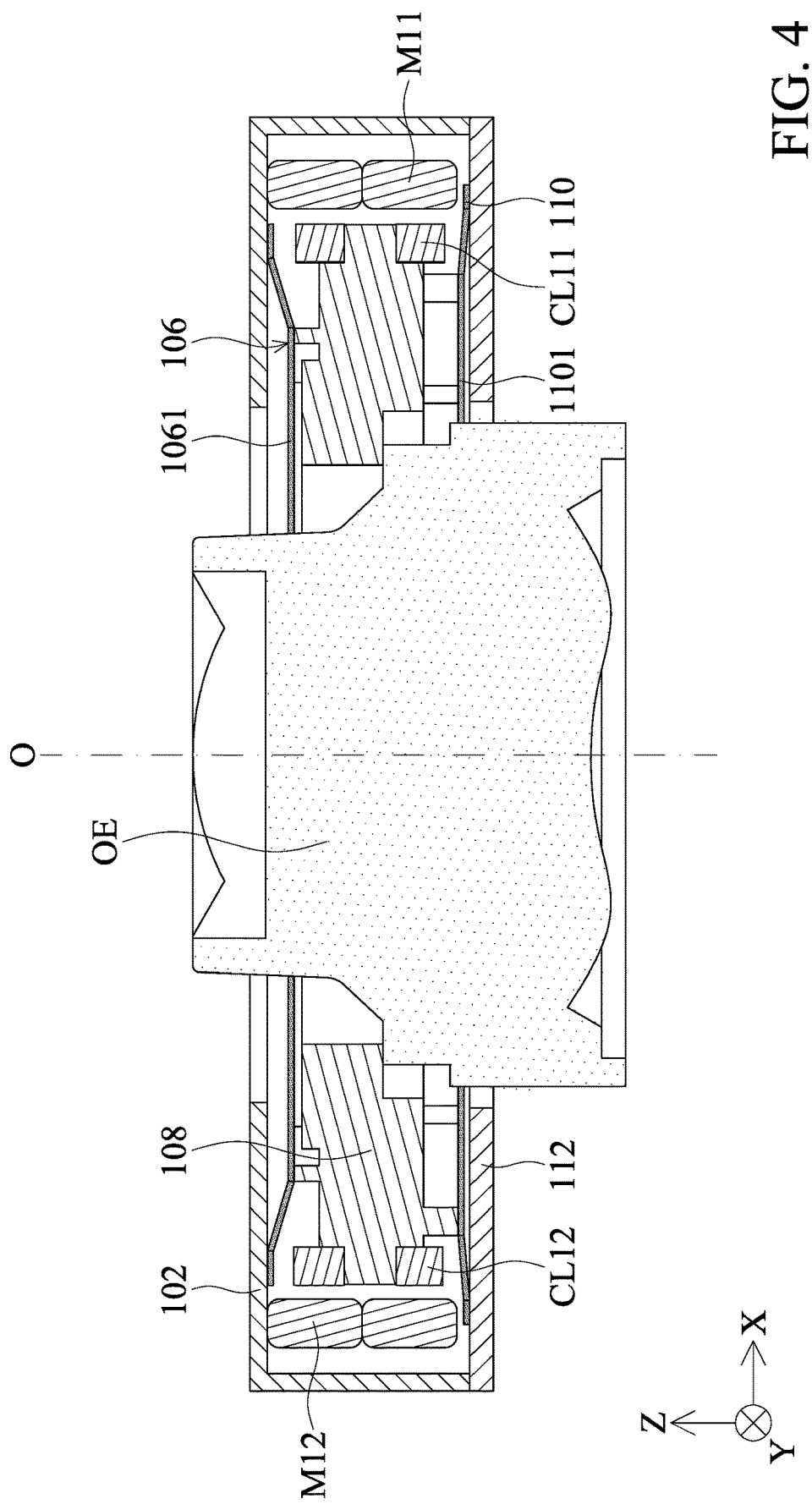
FIG. 4 is a cross-sectional view of the optical element driving mechanism 100 along line A-A' in FIG. 3 according to an embodiment of the present disclosure.

Next, please refer to FIG. 2 to FIG. 4. FIG. 2 is an exploded diagram of the optical element driving mechanism 100 according to an embodiment of the present disclosure, FIG. 3 is a partial exploded diagram of the optical element driving mechanism 100 according to an embodiment of the present disclosure, and FIG. 4 is a cross-sectional view of the optical element driving mechanism 100 along line A-A' in FIG. 3 according to an embodiment of the present disclosure. As shown in FIG. 2, in the present embodiment, the optical element driving mechanism 100 can include a fixed assembly FA, a movable assembly MA, and a driving assembly DA. The movable assembly MA is movably connected to the fixed assembly FA, and the movable assembly MA is configured to hold the optical element OE. The driving assembly DA is configured to drive the movable assembly MA to move relative to the fixed assembly FA.

In this embodiment, as shown in FIG. 2, the fixed assembly FA includes a casing 102 and a base 112. The movable assembly MA includes a lens holder 108 and the aforementioned optical element OE, and the lens holder 108 is used for holding the optical element OE.

As shown in FIG. 2, the casing 102 has a hollow structure, and a casing opening 1021 is formed thereon, and a base opening 1121 is formed on the base 112. The center of the casing opening 1021 corresponds to the optical axis O of the optical element OE, and the base opening 1121 corresponds to a photosensitive element (such as the photosensitive element 150 in FIG. 1) disposed under the base 112. The external light can enter the casing 102 from the casing opening 1021 to be received by the photosensitive element 150 after passing through the optical element OE and the base opening 1121 so as to generate a digital image signal.

Furthermore, the casing 102 is disposed on the base 112 and may have an accommodating space 1023 for accommodating the movable assembly MA (including the aforementioned optical element OE and the lens holder 108) and the driving assembly DA.

The movable assembly MA may further include a first elastic member 106 and a second elastic member 110. The outer portion (the outer ring portion) of the first elastic member 106 is fixed to the inner wall surface of the casing 102, the outer portion (the outer ring portion) of the second elastic member 110 is fixed to the base 112, and the inner portions (the inner ring portions) of the first elastic member 106 and the second elastic member 110 are respectively connected to the upper and lower sides of the lens holder 108, so that the lens holder 108 can be suspended in the accommodating space 1023.

In this embodiment, the driving assembly DA may include a first magnet M11, a second magnet M12, a first coil CL11, and a second coil CL12. The first coil CL11 and the second coil CL12 are disposed on the lens holder 108, and the first magnet M11 and the second magnet M12 are disposed on the inner wall surface of the casing 102 respectively corresponding to the first coil CL11 and the second coil CL12.

In this embodiment, the first coil CL11 and the second coil CL12 may be wound coils and be disposed on opposite sides of the lens holder 108. When the first coil CL11 and the second coil CL12 are provided with electricity, the first coil CL11 and the second coil CL12 respectively act with the first magnet M11 and the second magnet M12 to generate an electromagnetic force, so as to drive the lens holder 108 and the held optical element OE to move relative to the base 112 along the optical axis O (the Z-axis).

Figure 5:
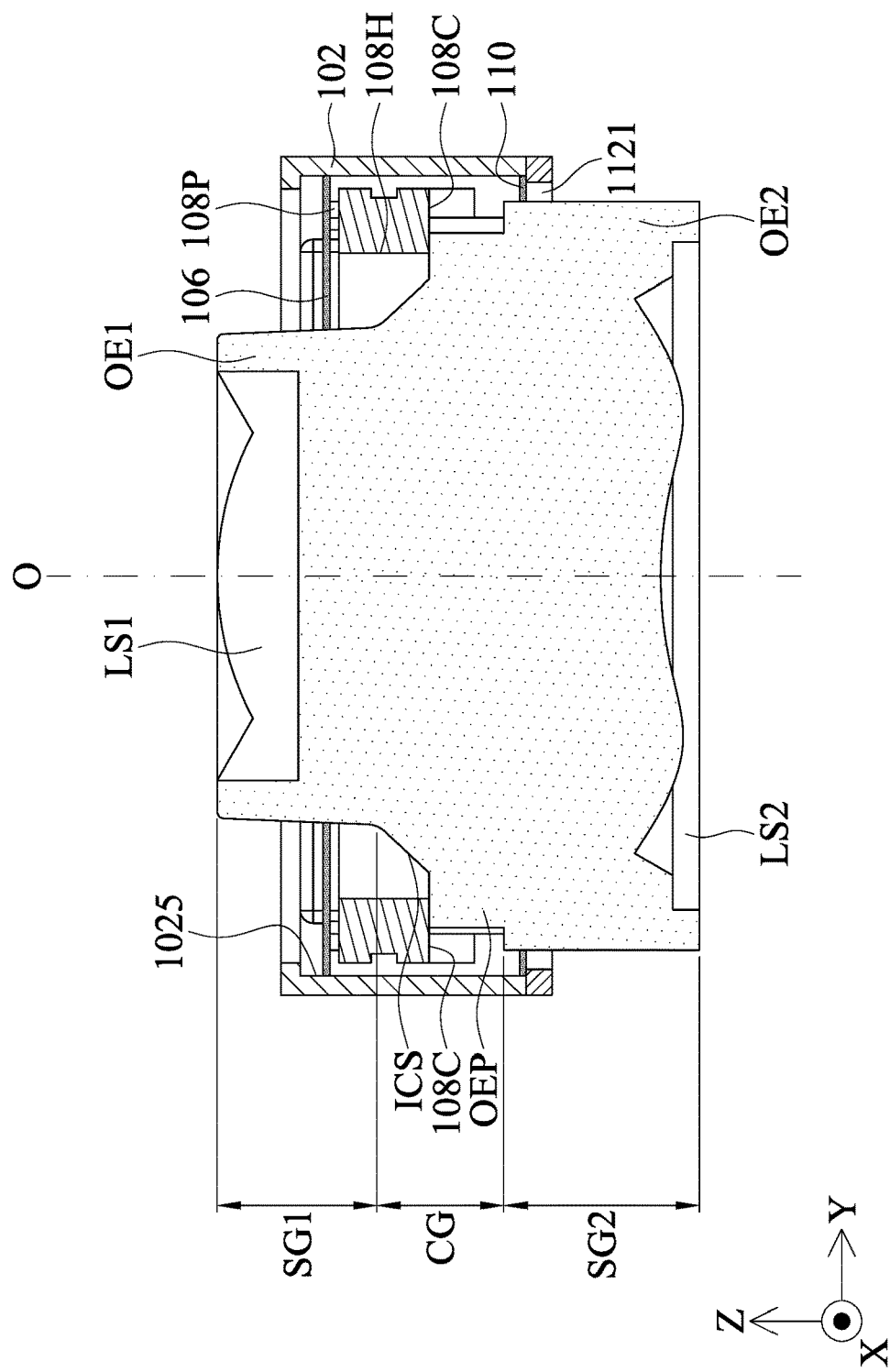
FIG. 5 is a cross-sectional view of the optical element driving mechanism 100 along line B-B' in FIG. 3 according to an embodiment of the present disclosure.

Furthermore, please refer to FIG. 5, which is a cross-sectional view of the optical element driving mechanism 100 along line B-B' in FIG. 3 according to an embodiment of the present disclosure. In this embodiment, the optical element OE may define a first section SG1, a second section SG2, and a central section CG disposed between the first section SG1 and the second section SG2. When viewed in a direction perpendicular to the optical axis O (for example, along the X-axis), the maximum size of the first section SG1 is different from the maximum size of the second section SG2 (for example, along the Y-axis).

As shown in FIG. 5, the central section CG has an intermediate surface ICS that is not parallel to the optical axis O, and the lens holder 108 of the movable assembly MA has an opening 108H (the moving assembly opening) for accommodating the optical element OE, and the opening 108H corresponds to the optical axis O.

When viewed in the direction perpendicular to the optical axis O, as shown in FIG. 5, the maximum size of the base opening 1121 (the fixed assembly opening) is different from the maximum size of the opening 108H, and the central section CG is located between the opening 108H and the base opening 1121. In this embodiment, the base opening 1121 is larger than the opening 108H, but it is not limited thereto. In other embodiments, the opening 108H can be larger than the base opening 1121.

The first section SG1 includes a first lens barrel OE1 and a first lens LS1. The second section SG2 includes a second lens barrel OE2 and a second lens LS2, and the diameters of the first lens LS1 and the second lens LS2 are different.

In this embodiment, the lens holder 108 is fixedly connected to at least one of the first lens barrel OE1, the second lens barrel OE2, and the central section CG by an adhesive element, such as glue.

Figure 6:
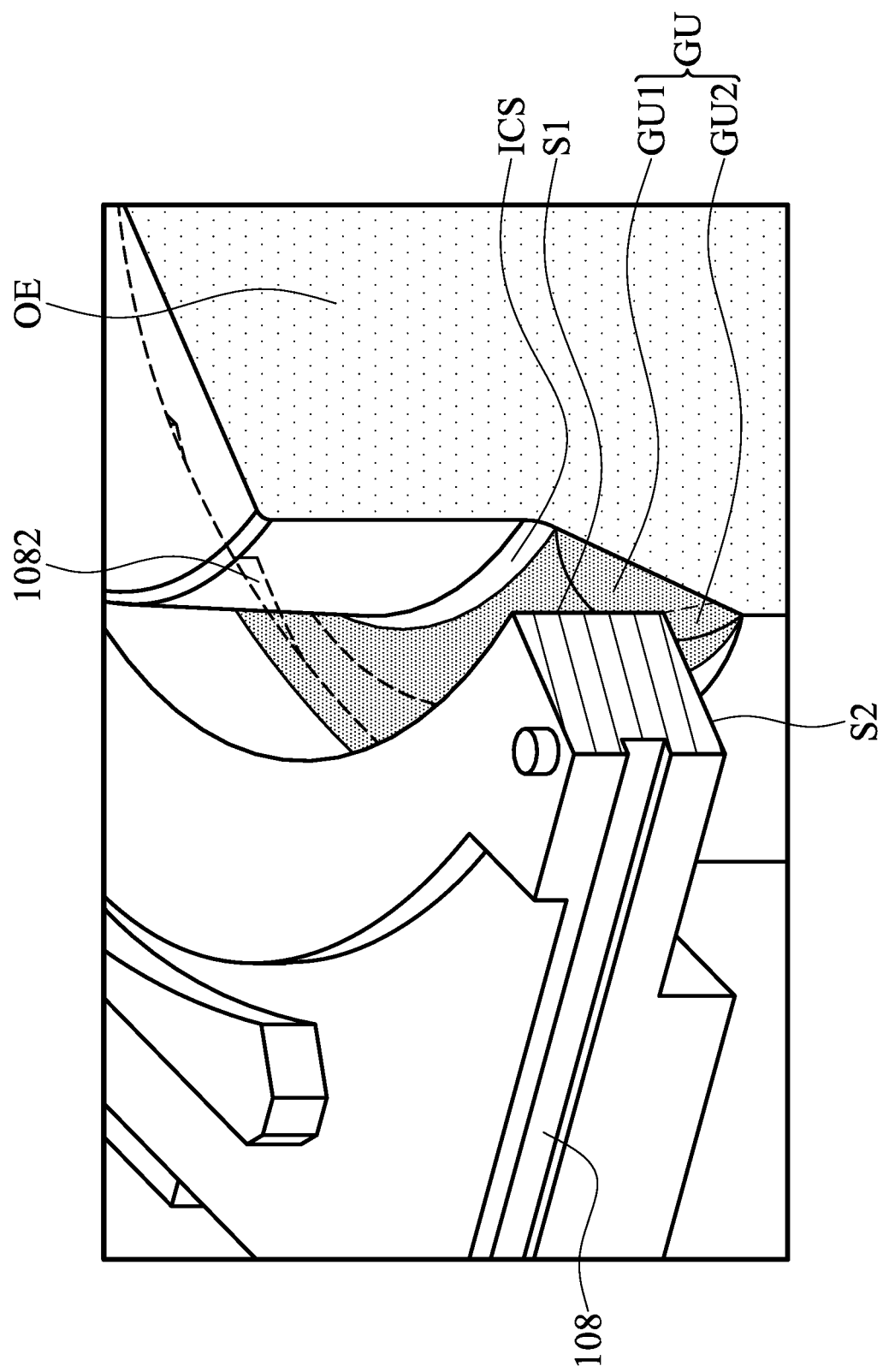
FIG. 6 is a perspective cross-sectional diagram of the optical element driving mechanism 100 according to an embodiment of the present disclosure.

Specifically, please refer to FIG. 2 and FIG. 6. FIG. 6 is a perspective cross-sectional diagram of the optical element driving mechanism 100 according to an embodiment of the present disclosure. The lens holder 108 can include a body 1081 and a contacting portion 1082, and the contacting portion 1082 can be a platform disposed between the optical element OE and the body 1081. Therefore, a gap is formed between the central section CG and the lens holder 108 of the movable assembly MA, and then adhesive element GU can be disposed in the gap.

Furthermore, as shown in FIG. 6, the lens holder 108 of the movable assembly MA has a first surface S1 and a second surface S2 which are perpendicular to each other, and a first portion GU1 of the adhesive element GU is connected to the first surface S1. A second portion GU2 of the adhesive element GU is connected to the second surface S2, and the size of the first portion GU1 is larger than that of the second portion GU2.

Please refer to FIG. 3 and FIG. 5. The lens holder 108 of the movable assembly MA may have a polygonal structure. In this embodiment, the lens holder 108 has a rectangular structure, and the lens holder 108 has a first side 1083, a second side 1084, and two concave grooves 108C. The concave groove 108C is disposed on the first side 1083 of the lens holder 108, and the concave groove 108C is formed along a direction parallel to the optical axis O. When viewed along the optical axis O, the concave groove 108C only partially overlaps the first section SG1 or the second section SG2. As shown in FIG. 5, in this embodiment, the concave groove 108C partially overlaps the second section SG2.

Furthermore, the optical element OE may have a first corresponding portion OEP exposed from the concave groove 108C and directly facing a side wall 1025 of the casing 102, and the side wall 1025 is parallel to the optical axis O. When viewed in the direction perpendicular to the optical axis O, as shown in FIG. 5, no part of the movable assembly MA is located between the first corresponding portion OEP and the side wall 1025. Specifically, no element is disposed between the first corresponding portion OEP and the side wall 1025.

As shown in FIG. 3 and FIG. 5, the lens holder 108 further has a projecting portion 108P. The projecting portion 108P and the concave groove 108C are arranged along the direction parallel to the optical axis O. The projecting portion 108P extends along the direction parallel to the optical axis O. When viewed along the optical axis O, as shown in FIG. 5, the projecting portion 108P, the concave groove 108C, and the second section SG2 are partially overlapped.

Furthermore, as shown in FIG. 3 and FIG. 4, the lens holder 108 of the movable assembly MA is elastically connected to the fixed assembly FA via the first elastic member 106 and the second elastic member 110. The inner portion (a first movable connecting portion 1061) of the first elastic member 106 is fixedly disposed on the projecting portion 108P, and the inner portion (a second movable connecting portion 1101) of the second elastic member 110 is fixedly disposed on the bottom of the lens holder 108.

Figure 7:
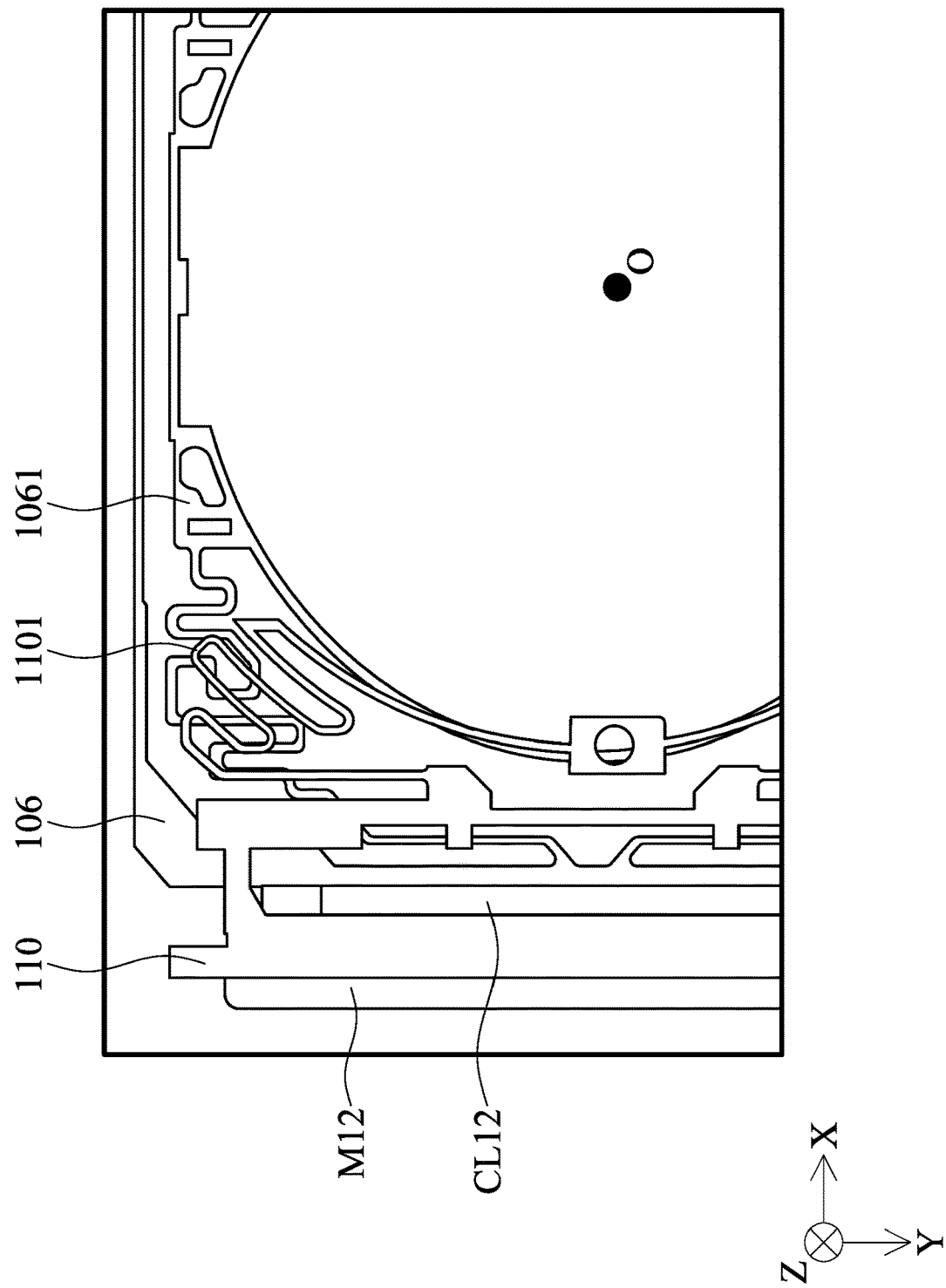
FIG. 7 is a bottom view of a part of the structure of the optical element driving mechanism 100 according to an embodiment of the present disclosure.

In addition, please refer to FIG. 7, which is a bottom view of a part of the structure of the optical element driving mechanism 100 according to an embodiment of the present disclosure. At least a part of the first movable connecting portion 1061 does not overlap the second movable connecting portion 1101 when viewed in the direction parallel to the optical axis O.

Figure 8:
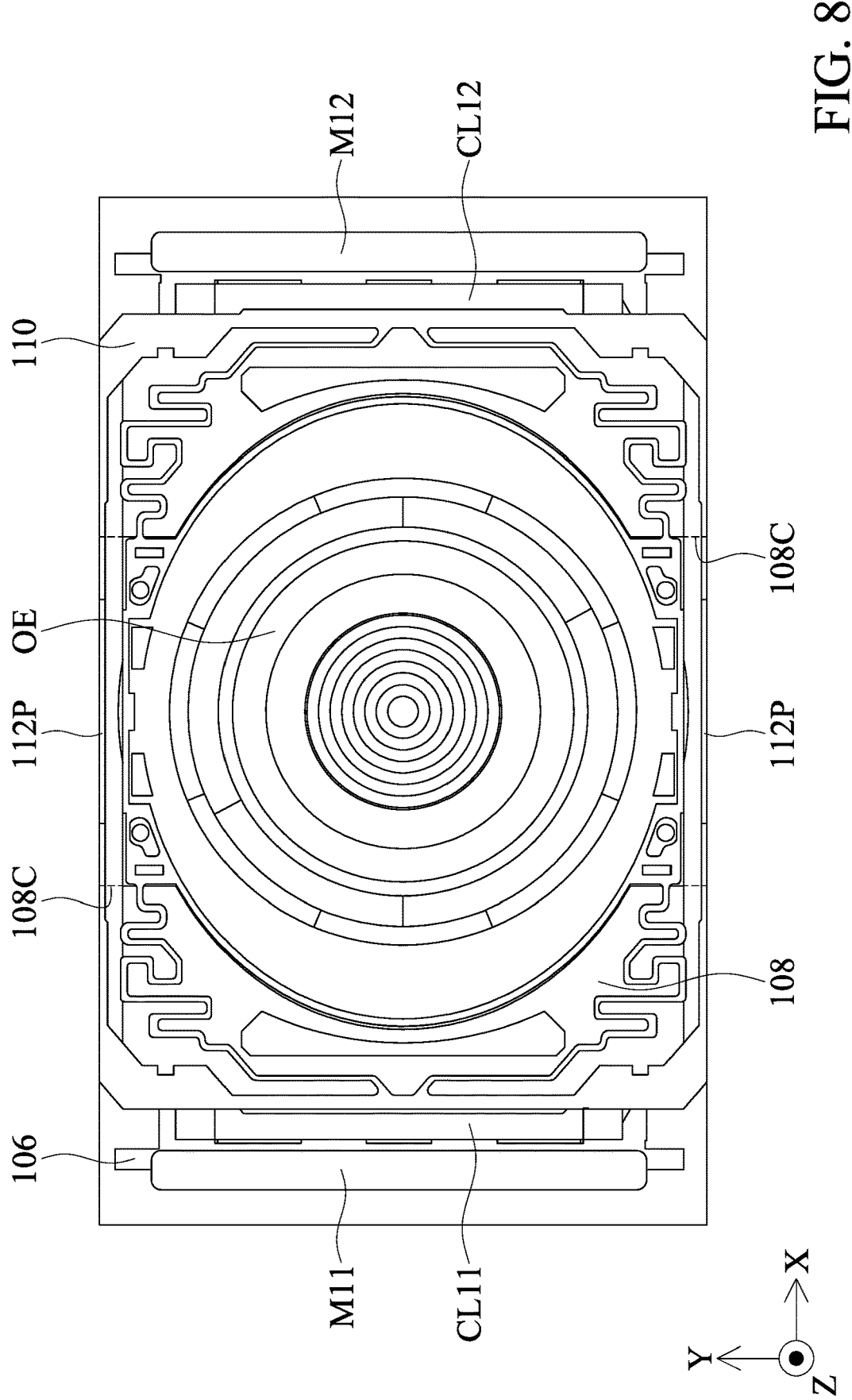
FIG. 8 is a top view of a part of the structure of the optical element driving mechanism 100 in accordance with an embodiment of the present disclosure.

Please refer to FIG. 3 and FIG. 8. FIG. 8 is a top view of a part of the structure of the optical element driving mechanism 100 in accordance with an embodiment of the present disclosure. In this embodiment, the base 112 can have at least one protrusion 112P, and the protrusion 112P and the concave groove 108C are located on the first side 1083 of the lens holder 108. The protrusion 112P partially overlaps the concave groove 108C when viewed along the optical axis O (the Z-axis).

Figure 9:
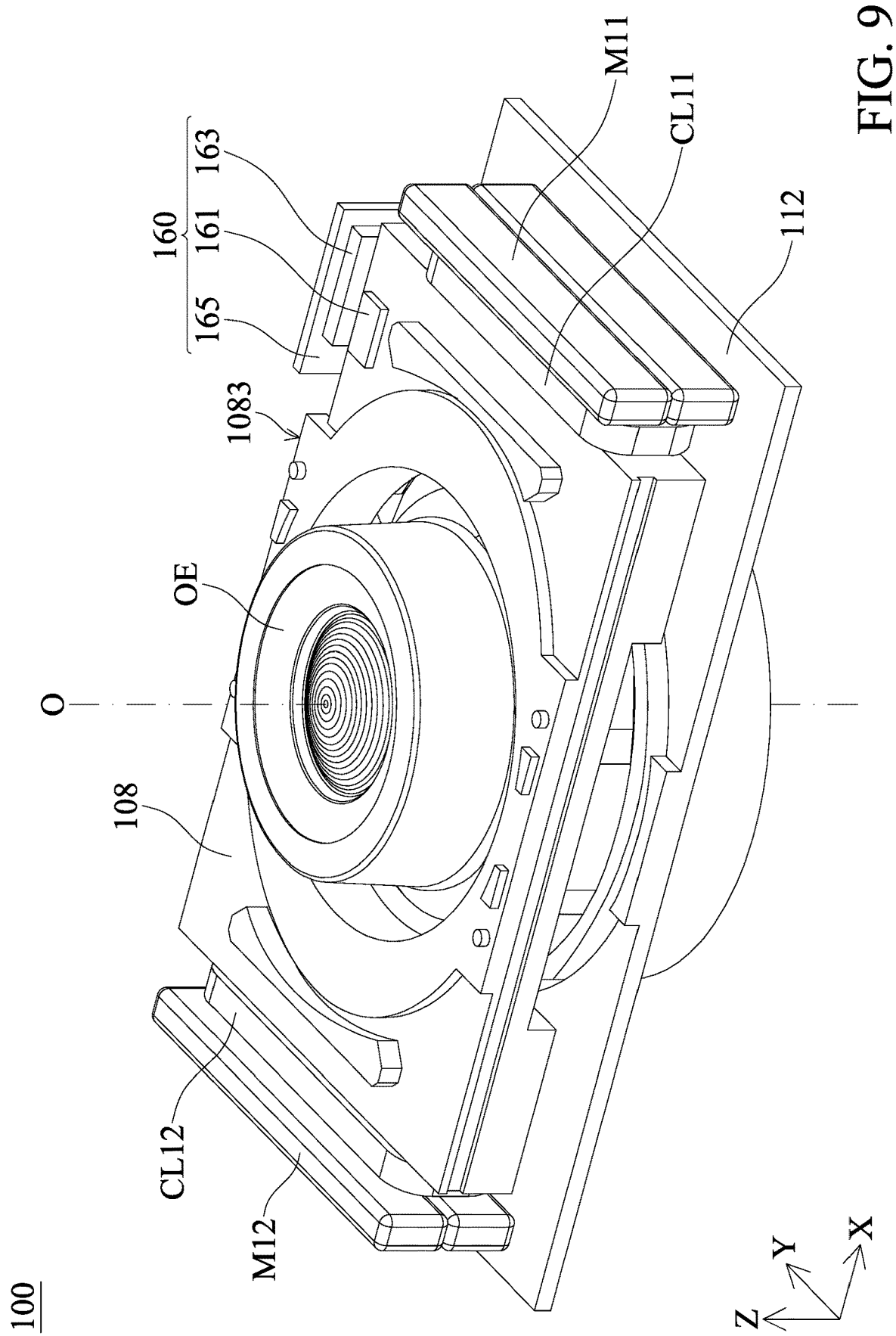
FIG. 9 is a partial structural diagram of the optical element driving mechanism 100 according to another embodiment of the present disclosure.
Figure 10:
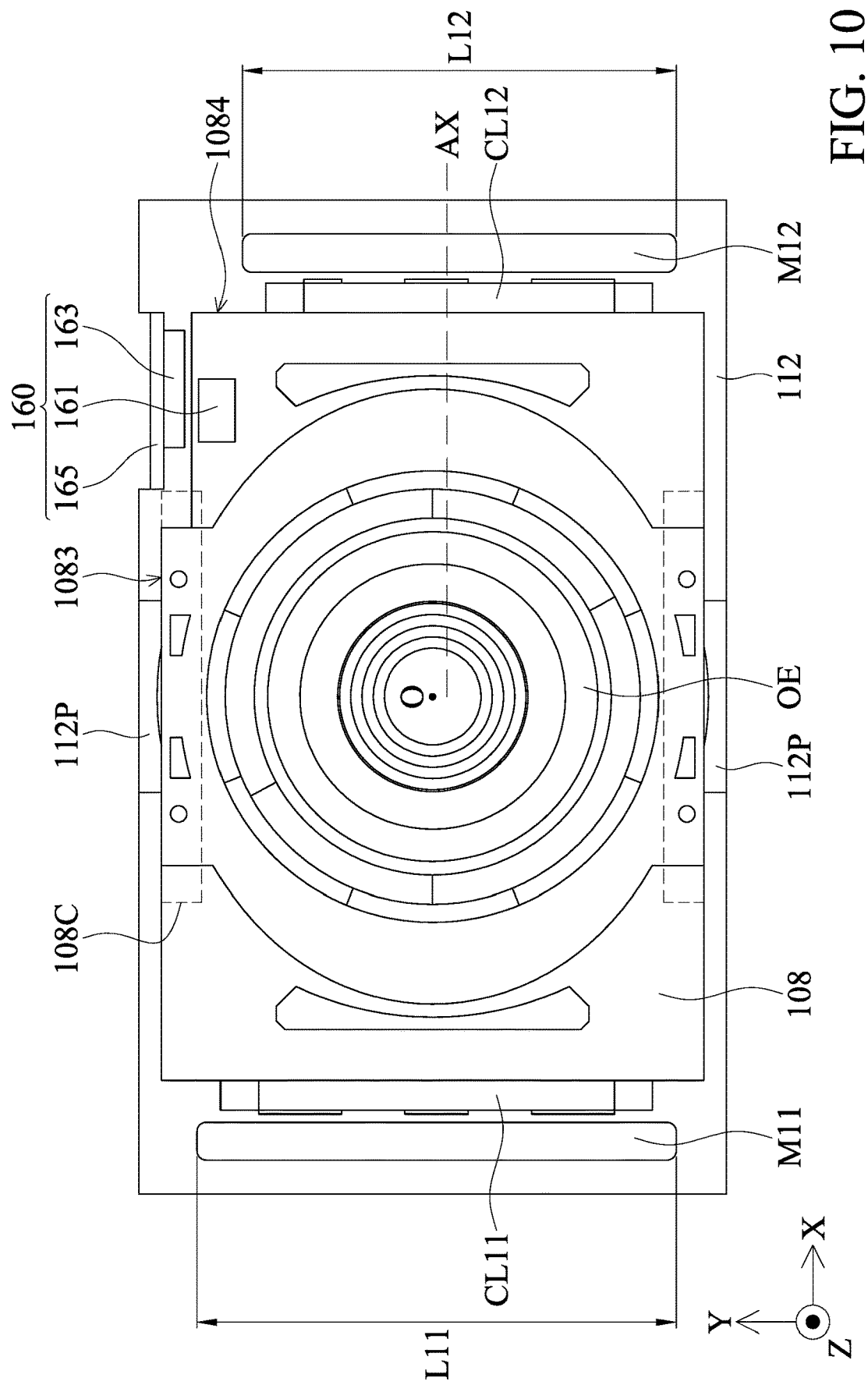
FIG. 10 is a top view of the optical element driving mechanism 100 in FIG. 9 according to another embodiment of the present disclosure.

Please refer to FIG. 9 and FIG. 10. FIG. 9 is a partial structural diagram of the optical element driving mechanism 100 according to another embodiment of the present disclosure, and FIG. 10 is a top view of the optical element driving mechanism 100 in FIG. 9 according to another embodiment of the present disclosure. In this embodiment, the optical element driving mechanism 100 can further include a position sensing assembly 160 for sensing the movement of the movable assembly MA relative to the fixed assembly FA, such as sensing the movement of the lens holder 108 relative to the base 112. The position sensing assembly 160 can include a magnet 161, a position sensor 163, and a circuit board 165. The magnet 161 is disposed on the first side 1083 of the lens holder 108, and the position sensor 163 is disposed on the circuit board 165 and is configured to sense the change of the magnetic field of the magnet 161.

As shown in FIG. 10, when viewed in a direction parallel to the first side 1083 (for example, viewed in the X-axis), the magnet 161 partially overlaps the concave groove 108C.

Furthermore, a portion of the driving assembly DA (the second coil CL12 and the second magnet M12) is disposed on the second side 1084 of the lens holder 108. When viewed along the X-axis, a central axis AX of the second magnet M12 is offset from the central axis (the optical axis O) of the optical element OE. That is, a length L12 of the second magnet M12 is smaller than a length L11 of the first magnet M11. Based on this design, it can prevent the position sensing assembly 160 from being interfered with by the magnetic field generated by the second magnet M12.

Figure 11:
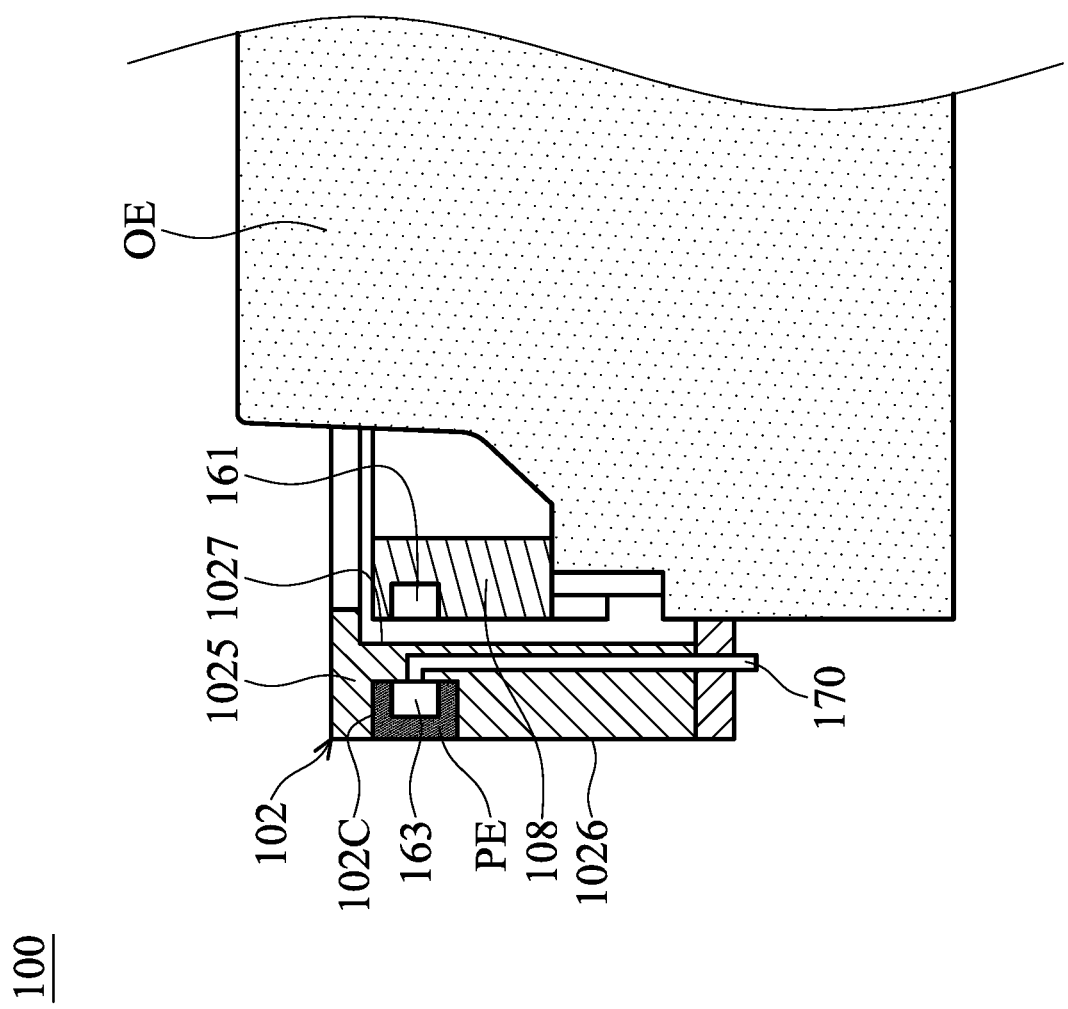
FIG. 11 is a cross-sectional view of the optical element driving mechanism 100 according to another embodiment of the present disclosure.

Please refer to FIG. 11, which is a cross-sectional view of the optical element driving mechanism 100 according to another embodiment of the present disclosure. In this embodiment, the casing 102 is made of a plastic material, and the position sensor 163 of the position sensing assembly 160 is disposed at the casing 102.

Specifically, the casing 102 includes a side wall 1025, and the side wall 1025 has a first side surface 1026 and a second side surface 1027 opposite to each other. The second side surface 1027 faces the optical element OE, and an accommodating groove 102C is formed on the first side surface 1026 and is configured to accommodate the position sensor 163. In other embodiments, the casing 102 may not have the accommodating groove 102C, and the position sensor 163 may be disposed directly on the first side surface 1026.

As shown in FIG. 11, the optical element driving mechanism 100 may further include a protective element PE disposed in the accommodating groove 102C and covering the position sensor 163. The protective element PE may be glue configured to fix and protect the position sensor 163.

In this embodiment, as shown in FIG. 11, the optical element driving mechanism 100 may further include a circuit member 170 embedded in the casing 102 of the fixed assembly FA, and the circuit member 170 is configured to be electrically connected to the position sensor 163 and an external circuit. The circuit member 170 can be implemented by insert molding technology, but it is not limited to this embodiment.

The present disclosure provides an optical element driving mechanism 100 disposed in a portable electronic device. Because the optical element driving mechanism 100 has a rectangular structure, the area of the touch panel 12 of the portable electronic device can be designed to be larger. In addition, the optical element driving mechanism 100 having the rectangular structure can improve the performance of the photographing, achieve the purpose of miniaturization, and improve image quality at the same time.

In addition, in some embodiments of the present disclosure, the lens holder 108 has a rectangular structure, and two concave grooves 108C are disposed on the two first sides 1083 of the rectangular structure. The concave grooves 108C are configured to accommodate a portion of the optical element OE, so that the lens holder 108 with a rectangular structure can accommodate a larger optical element OE, thereby improving the quality of the image.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
an optical element, having an optical axis;
a fixed assembly;
a movable assembly, movably with respect to the fixed assembly and configured to hold the optical element; and
a driving assembly, configured to drive the movable assembly to move relative to the fixed assembly,
wherein when viewed along the optical axis, the optical element driving mechanism has a rectangular structure which has a long side and a short side, and a length of the long side is not equal to a length of the short side,
wherein the optical element includes a first section, a second section and a central section disposed between the first section and the second section,
wherein the fixed assembly has a casing opening and a base opening, light travels from a light incident end into the casing opening and the optical element, and the light exits from the base opening to a light exiting end,
wherein when viewed in a direction perpendicular to the optical axis, the first section is protruded from the casing opening, and the second section is protruded from the base opening out of the fixed assembly, and
wherein the first section includes a first lens, the second section includes a second lens, a portion of the first lens is outside of the fixed assembly, and the second lens is totally outside of the fixed assembly.

2. The optical element driving mechanism as claimed in claim 1, wherein when viewed in a direction perpendicular to the optical axis, a maximum size of the first section is different from a maximum size of the second section, the central section has an intermediate surface that is not parallel to the optical axis, and the movable assembly has a moving assembly opening for accommodating the optical element and corresponding to the optical axis;
wherein when viewed in the direction perpendicular to the optical axis, a maximum size of the base opening is different from a maximum size of the moving assembly opening, and the central section is located between the moving assembly opening and the base opening.

3. The optical element driving mechanism as claimed in claim 2, wherein the first section includes a first lens barrel, the second section includes a second lens barrel, and diameters of the first lens and the second lens are different.

4. The optical element driving mechanism as claimed in claim 3, wherein the movable assembly includes a lens holder, and the lens holder is fixedly connected to at least one of the first lens barrel, the second lens barrel and the central section by an adhesive element.

5. The optical element driving mechanism as claimed in claim 4, wherein the lens holder further includes a body and a contacting portion, and the contacting portion is disposed between the optical element and the body, so that a gap is formed between the central section and the movable assembly, and the adhesive element is disposed in the gap.

6. The optical element driving mechanism as claimed in claim 5, wherein the movable assembly has a first surface and a second surface perpendicular to each other, a first portion of the adhesive element is connected to the first surface, a second portion of the adhesive element is connected to the second surface, and the first portion is larger than the second portion.

7. The optical element driving mechanism as claimed in claim 2, wherein the movable assembly with a polygonal structure has a concave groove, disposed on a first side of the moving assembly, the concave groove is formed along a direction parallel to the optical axis, and when viewed along the optical axis, the concave groove only partially overlaps the first section or the second section.

8. The optical element driving mechanism as claimed in claim 7, wherein a first corresponding portion of the optical element is exposed from the concave groove and directly faces a side wall of the fixed assembly, and the side wall is parallel to the optical axis, wherein when viewed in the direction perpendicular to the optical axis, no part of the movable assembly is located between the first corresponding portion and the side wall.

9. The optical element driving mechanism as claimed in claim 7, wherein the movable assembly further includes a projecting portion, the projecting portion and the concave groove are arranged along the direction parallel to the optical axis, the projecting portion extends along the direction parallel to the optical axis, and when viewed along the optical axis, the projecting portion, the concave groove, and the second section are partially overlapped.

10. The optical element driving mechanism as claimed in claim 9, wherein the optical element driving mechanism further comprises a first elastic member, the movable assembly is elastically connected to the fixed assembly via the first elastic member, and the first elastic member has a first movable connecting portion which is fixedly disposed on the projecting portion.

11. The optical element driving mechanism as claimed in claim 10, wherein the optical element driving mechanism further comprises a second elastic member, the movable assembly is elastically connected to the fixed assembly via the second elastic member, the second elastic member has a second movable connecting portion which is fixedly disposed on the movable assembly, and when viewed in the direction parallel to the optical axis, at least a part of the first movable connecting portion does not overlap the second movable connecting portion.

12. The optical element driving mechanism as claimed in claim 7, wherein the optical element driving mechanism further comprises a position sensing assembly for sensing movement of the movable assembly relative to the fixed assembly, and a portion of the position sensing assembly is disposed on the first side.

13. The optical element driving mechanism as claimed in claim 12, wherein when viewed in a direction parallel to the first side, the position sensing assembly partially overlaps the concave groove.

14. The optical element driving mechanism as claimed in claim 13, wherein a portion of the driving assembly is disposed on a second side of the movable assembly, and when viewed in the direction parallel to the first side, a central axis of the portion of the driving assembly is offset from a central axis of the optical element.

15. The optical element driving mechanism as claimed in claim 7, wherein the optical element driving mechanism further comprises a position sensing assembly, the fixed assembly is made of a plastic material, and a portion of the position sensing assembly is disposed on the fixed assembly.

16. The optical element driving mechanism as claimed in claim 15, wherein the fixed assembly includes a side wall, and the side wall has a first side surface and a second side surface opposite to each other, the second side surface faces the optical element, and an accommodating groove is formed on the first side surface and is configured to accommodate the portion of the position sensing assembly.

17. The optical element driving mechanism as claimed in claim 16, wherein the optical element driving mechanism further comprises a protective element disposed in the accommodating groove and covering the portion of the position sensing assembly.

18. The optical element driving mechanism as claimed in claim 17, wherein the optical element driving mechanism further comprises a circuit member embedded in the fixed assembly.

19. The optical element driving mechanism as claimed in claim 7, wherein the fixed assembly includes a base, the base has a protrusion, and the protrusion and the concave groove are on a same side of the optical element driving mechanism.

20. The optical element driving mechanism as claimed in claim 19, wherein the protrusion partially overlaps the concave groove when viewed along the optical axis.

21. The optical element driving mechanism as claimed in claim 1, wherein the optical element driving mechanism is disposed on an electronic device, and the long side of the optical element driving mechanism and a long side of the electronic device are not parallel.

22. An optical element driving mechanism, comprising:
an optical element, having an optical axis;
a fixed assembly;
a movable assembly, movably with respect to the fixed assembly and configured to hold the optical element; and
a driving assembly, configured to drive the movable assembly to move relative to the fixed assembly,
wherein when viewed along the optical axis, the optical element driving mechanism has a rectangular structure which has a long side and a short side, and a length of the long side is not equal to a length of the short side,
wherein the optical element includes a first section, a second section and a central section disposed between the first section and the second section,
wherein the fixed assembly has a casing opening and a base opening, light travels from a light incident end into the casing opening and the optical element, and the light exits from the base opening to a light exiting end,
wherein when viewed in a direction perpendicular to the optical axis, the first section is protruded from the casing opening, and the second section is protruded from the base opening,
wherein when viewed in a direction perpendicular to the optical axis, a maximum size of the first section is different from a maximum size of the second section, the central section has an intermediate surface that is not parallel to the optical axis, and the movable assembly has a moving assembly opening for accommodating the optical element and corresponding to the optical axis,
wherein when viewed in the direction perpendicular to the optical axis, a maximum size of the base opening is different from a maximum size of the moving assembly opening, and the central section is located between the moving assembly opening and the base opening, and
wherein the movable assembly with a polygonal structure has a concave groove, disposed on a first side of the moving assembly, the concave groove is formed along a direction parallel to the optical axis, and when viewed along the optical axis, the concave groove only partially overlaps the first section or the second section.

* * * * *